United States Patent
Ishimatsu et al.

(10) Patent No.: US 9,069,126 B2
(45) Date of Patent: Jun. 30, 2015

(54) OPTICAL ELEMENT, OPTICAL SYSTEM AND OPTICAL APPARATUS HAVING ANTIREFLECTION COATING

(71) Applicant: CANON KABUSHIKI KAISHA, Tokyo (JP)

(72) Inventors: Rie Ishimatsu, Utsunomiya (JP); Takeharu Okuno, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 13 days.

(21) Appl. No.: 14/132,083

(22) Filed: Dec. 18, 2013

(65) Prior Publication Data

US 2014/0177059 A1    Jun. 26, 2014

(30) Foreign Application Priority Data

Dec. 20, 2012 (JP) ................................. 2012-278006

(51) Int. Cl.
*G02B 1/118* (2015.01)
*G02B 1/115* (2015.01)

(52) U.S. Cl.
CPC ............... *G02B 1/118* (2013.01); *G02B 1/115* (2013.01)

(58) Field of Classification Search
CPC ........... G02B 1/118; G02B 1/115; G02B 1/11
See application file for complete search history.

(56) References Cited

U.S. PATENT DOCUMENTS

2009/0081361 A1 * 3/2009 Yamada et al. ............... 427/162

FOREIGN PATENT DOCUMENTS

| JP | 2008-233880 A | 10/2008 |
|---|---|---|
| JP | 2009-042472 A | 2/2009 |
| JP | 2010-271404 A | 12/2010 |

* cited by examiner

*Primary Examiner* — Joseph P Martinez
(74) *Attorney, Agent, or Firm* — Rossi, Kimms & McDowell LLP

(57) ABSTRACT

An optical element includes a transparent substrate and an antireflection coating on the substrate. The antireflection coating includes an intermediate layer on the substrate, and an undulation layer that is formed on the intermediate layer and has a plurality of convexes arrayed with spacing shorter than a shortest wavelength. The undulation layer has a portion where refractive index increases from a light incident side to the substrate. The intermediate layer has a first layer closest to the substrate, and a second layer formed on the first layer. A refractive index $n1$ of the first layer, a refractive index $n2$ of the second layer, and a refractive index $ns$ of the substrate satisfy the following conditional equations:

$1.75 \leq ns \leq 2.20$;

$n1 < n2$; and $n1 < ns$.

17 Claims, 13 Drawing Sheets

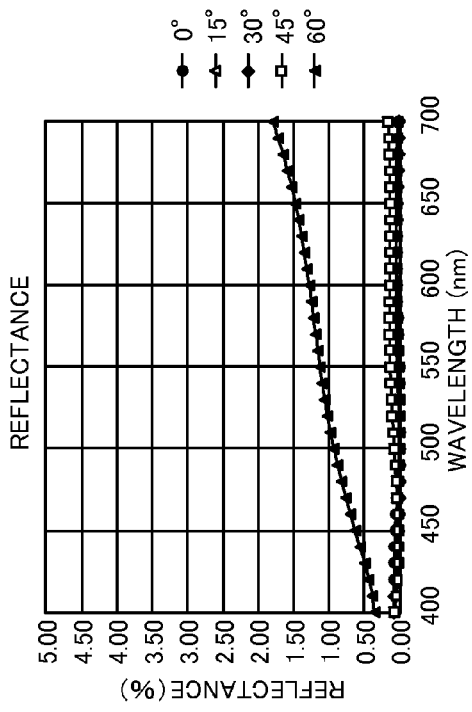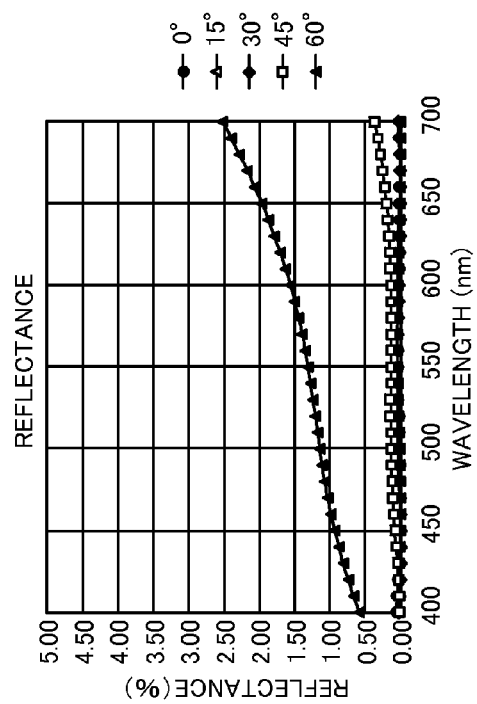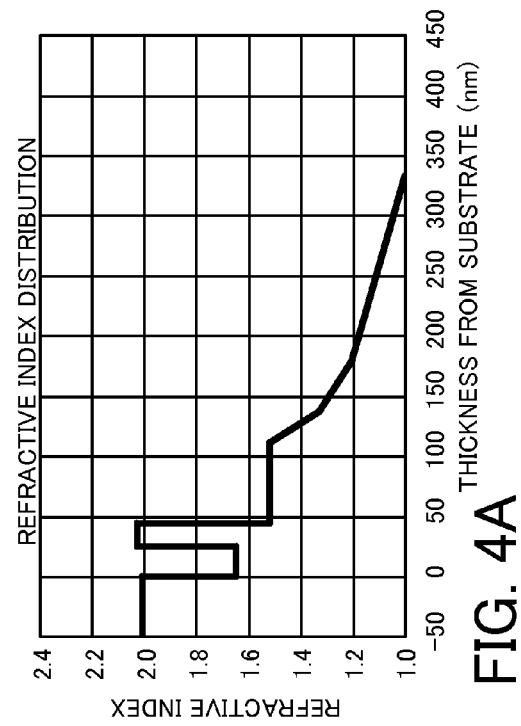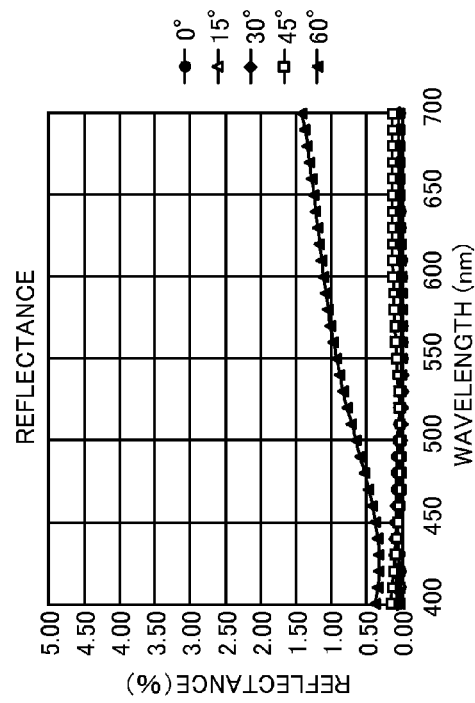
FIG. 4A
FIG. 4B
FIG. 4C
FIG. 4D

OPTICAL ELEMENT, OPTICAL SYSTEM AND OPTICAL APPARATUS HAVING ANTIREFLECTION COATING

BACKGROUND OF THE INVENTION

1. Field of the Invention

The present invention relates to an optical element, optical system and optical apparatus that have an antireflection coating.

2. Description of the Related Art

A dielectric multilayer film, generally called a multi-coated film, is widely used as an antireflection coating. This is configured to adjust the amplitudes and phases of reflected waves generated on a surface and an interface of each coating by laminating thin films with different refractive indexes and to reduce reflected light by making the reflected light fluxes interfere each other. Japanese Patent Laid-Open No. ("JP") 2010-271404 discloses a lens that has an antireflection coating configured with five layers of dielectric thin films, which are formed on a substrate with a refractive index of 1.90 or more using the vacuum evaporation deposition or electron beam evaporation method.

Each of JPs 2008-233880 and 2009-42472 discloses a lens that has a fine, antireflection structure shorter than a used wavelength. The light that has entered the structure shorter than the wavelength is configured to behave as if the light entered a medium having a refractive index (effective refractive index $n_{eff}$) equivalent to a volume ratio of a material of the fine structure. Then, the following equation is established based upon a Lorentz-Lorenz equation with a refractive index $n_m$ of the material of the fine structure and space filling factor ff:

$$(n_{eff}^2-1)/(n_{eff}^2+2)=ff(n_m^2-1)/(n_m^2+2) \tag{1}$$

JP 2008-233880 discloses an antireflection coating in which an effective refractive index continuously changes from a light incident side to a substrate and a plate crystal containing aluminum oxide as a primary ingredient is used for the top layer. Since the light reflection takes place in the interface between two substances with different refractive indexes, the reflected wave is suppressed in the structure having such a continuously changing refractive index. JP 2009-42472 discloses an antireflection coating that has a top layer as a low-refractive-index layer having a fine undulation structure and a multilayer film containing a two or more layers between the top layer and the substrate. The multilayer film disposed between the top layer and the substrate has a gradually decreasing refractive index from the substrate side to the fine undulation structure.

Since the antireflection coatings disclosed in Japanese Patent Laid-Open Nos. 2010-271404 and 2009-42472 adjust the amplitude and phase of a reflected wave generated on the surface or interface of each film, the antireflection characteristic deteriorates for obliquely incident light (in particular, with an incident angle of 30° or more) in which the interference condition is not satisfied. In addition, because of the high thickness sensitivity, the antireflection performance remarkably deteriorates when the thickness varies by only several percentages. The antireflection characteristic of the antireflection coating disclosed in JP 2008-233880 deteriorates for a substrate having a high refractive index because the refractive index difference is high in the interface between the fine undulation structure and the organic resin layer.

SUMMARY OF THE INVENTION

The present invention provides an optical element, optical system, and optical apparatus, having a good wavelength band characteristic and incident angle characteristic for a substrate having a high refractive index.

An optical element according to the present invention includes a substrate that is transparent to light having a used wavelength region and an antireflection coating formed on the substrate. The antireflection coating includes an intermediate layer formed on the substrate, and an undulation layer that is formed on the intermediate layer and has a plurality of convexes arrayed with spacing shorter than a shortest wavelength in the used wavelength region. The undulation layer has a portion where refractive index increases from a light incident side to the substrate. The intermediate layer has a first layer closest to the substrate, and a second layer formed on the first layer. When a refractive index of the first layer to light having a wavelength of 550 nm is denoted by n1, a refractive index of the second layer to the light having the wavelength of 550 nm is denoted by n2, and a refractive index of the substrate to the light having the wavelength of 550 nm is denoted by ns, the following conditional equations are satisfied:

$$1.75 \leq ns \leq 2.20;$$

$$n1 < n2; \text{ and}$$

$$n1 < ns.$$

Further features of the present invention will become apparent from the following description of exemplary embodiments with reference to the attached drawings.

BRIEF DESCRIPTION OF THE DRAWINGS

FIGS. 4A, 4B, 4C and 4D are graphs of a refractive index distribution and reflectance characteristics, respectively, of an antireflection coating according to a third embodiment of the present invention.

DESCRIPTION ACCORDING TO THE EMBODIMENTS

Figure 1A:
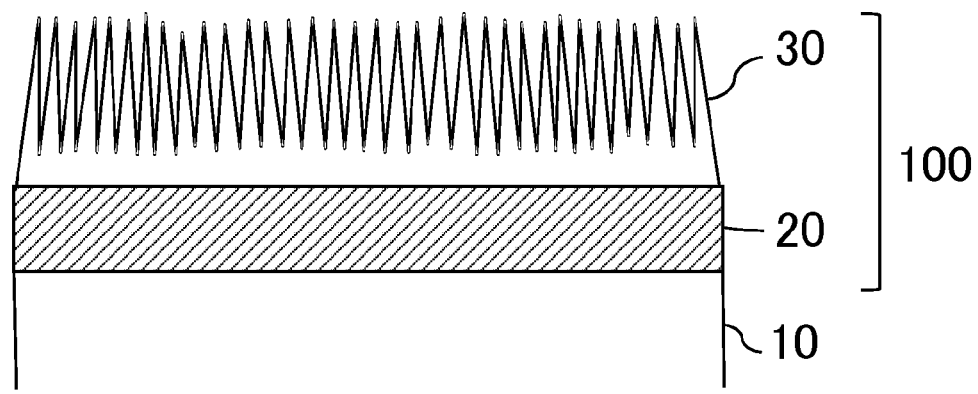
FIGS. 1A and 1B are a schematic partially sectional view and a refractive index distribution diagram, respectively, of an antireflection coating according to the embodiment.
Figure 1B:
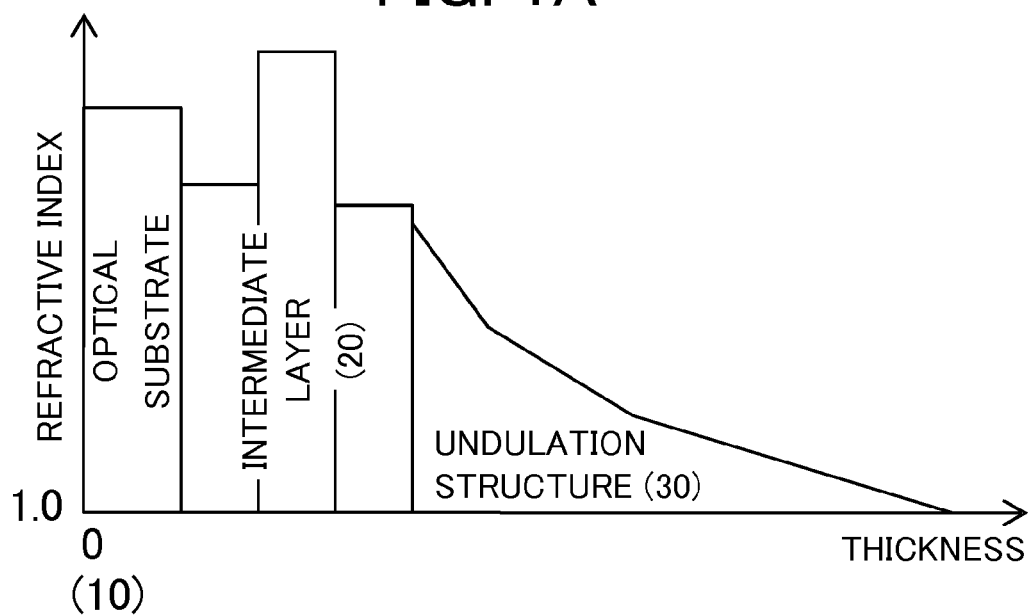

Referring now to the accompanying drawings, a detailed description will be given of this embodiment will be given. Refractive index values in the description are values observed for light with a wavelength of 550 nm. FIG. 1A is a schematic partially sectional view of an optical element common to respective embodiments. FIG. 1B is a refractive index distribution diagram of the optical element. In FIG. 1B, the abscissa axis represents a thickness and the ordinate axis represents a refractive index. FIG. 1A is an enlarged view of an optical substrate 10 (a glass substrate, referred to as "substrate" hereinafter) with a high refractive index (of 1.75 or more and 2.2 or less). FIG. 1A contains an antireflection coating 100. In this embodiment, a substrate 10 is transparent for light in a wavelength bandwidth within a used wavelength region (optical wavelength).

The antireflection coating 100 reduces surface reflections of incident and emitting light fluxes, and includes a fine undulation structure 30 and an intermediate layer 20, which is formed between the substrate 10 and the fine undulation structure 30 (undulation layer) and made of a multilayer film. Each layer in the multilayer film has a different refractive index.

The fine undulation structure (undulation layer) 30 is a top layer and has an undulation structure containing a plurality of convexes arrayed with spacing shorter than the shortest wavelength (40 nm in this embodiment) in a used wavelength region. The fine undulation structure 30 may be a porous layer containing aluminum oxide as the primary ingredient. Since the fine undulation structure 30 has a portion where a space filling factor ff continuously increases from the light incident side to the intermediate layer 20 (although the refractive index is constant in a homogeneous portion (homogeneous layer) described later), the effective refractive index $n_{eff}$ of the fine undulation structure 30 continuously increases from the light incident side to the intermediate layer 20. It is sufficient that the undulation structure 30 has the portion where the refractive index increases from the light incident side to the substrate side.

For a high antireflection effect, the thickness of the fine undulation structure 30 may be 180 nm or longer and 300 nm or shorter. The thickness less than 180 nm narrows the wavelength band in which the antireflection performance is maintained high and the reflectance increases particularly on the long wavelength side (around 650 nm to 700 nm) of the visible light. The thickness more than 300 nm reduces a transmittance due to scattering caused by the randomness in the structure.

A manufacturing method of the fine undulation structure 30 is not particularly limited, the fine undulation structure 30 may be formed for the mass production through a steam or warm water treatment to a aluminum oxide (alumina) containing film deposited with a vacuum film deposition method or liquid phase method (sol-gel method). The fine undulation structure 30 thus may be formed with the wet process. When aluminum oxide is used, the effective refractive index of the fine undulation structure 30 is almost 1 on a side closest to the light incident, continuously increases to the intermediate layer 20, and the maximum value of the reflectance falls in a range of 1.35 to 1.58.

The fine undulation structure 30 may have a homogeneous portion, which is a layer with a constant refractive index, on the side contacting the intermediate layer 20. For example, in treating an aluminum oxide film with steam or warm water, the fine undulation structure 30 is formed, in which the plate crystal made of aluminum oxide separates out of the top layer and the space filling factor changes in the thickness direction. An amorphous aluminum oxide layer (homogeneous portion) may remain underneath the fine undulation structure 30. At this time, the thickness of the remaining homogeneous portion can be controlled by controlling the treatment duration, treatment temperature, content of aluminum oxide in the material, and contents of additives such as a stabilizer and a catalyst. This embodiment is not limited to treating the aluminum oxide film with steam or warm water and is applicable to forming a fine undulation structure on a surface of an optical element with a method such as nano-imprinting. The refractive index of the homogeneous portion may or may not be identical to the refractive index of a root section, which is closest to the homogeneous portion, of the fine undulation structure 30.

The intermediate layer 20 is formed on the substrate 10 and made of a multilayer film containing two or more layers with different refractive indexes. Since the fine undulation structure 30 is has a density less than that of a homogeneous structure, the moisture or the like from the outside may infiltrate through the fine undulation structure 30 and affect the optical substrate. Accordingly, the antireflection coating 100 is made more stable by forming the intermediate layer 20 made of the multilayer film between the fine undulation structure 30 and the optical substrate. For more improved stability, at least one thin-film sub-layer in the intermediate layer 20 may be a dense layer having a higher refractive index than the substrate 10.

The manufacturing method of each film in the intermediate layer 20 is not limited, and may select an arbitrary process such as a liquid phase method, vacuum evaporation method, and sputtering method. A dry process is suitable for forming a dense film, and the sputtering method is more suitable.

The refractive index of the substrate 10 is denoted by $n_s$ and thin film layers composing the intermediate layer 20 are numbered as a first layer, a second layer, and the like, in order from the side closest to the substrate 10. In other words, the first layer is closest to the substrate 10 and the second layer is formed on the first layer. If the refractive indexes of the first layer, the second layer, and the like are denoted by n1, n2, and the like, respectively, the conditional equations n1<ns and n1<n2 are satisfied. Herein, n1 is larger than 1.0. Each layer in the intermediate layer 20 can be thus made thinner than that of a multilayer film disclosed in JP 2009-042472 and an antireflection coating having a good incident angle characteristic can be realized. To achieve this effect fully, a refractive index difference between n1 and n2 may be 0.1 and up, more preferably 0.2 and up.

The antireflection coating 100 has a good antireflection characteristic on a wide wavelength band over the overall visible range (from wavelength 400 nm to 700 nm) and over a wide incident angle range from an incident angle of 0° to an incident angle of 60°. Accordingly, unnecessary light such as flare or ghost is less likely to occur in an optical system that includes an optical element (lens) on which an antireflection coating 100 is formed.

In order to obtain a good antireflection characteristic from the substrate 10 with the high refractive index (1.75≤ns≤2.20), the intermediate layer 20 may has a three-layer structure. A suitable three-layer structure may include a first layer with a refractive index of 1.35 or more and 1.78 or less, a second layer with a refractive index of 1.78 or more and 2.40 or less, and a third layer with a refractive index of 1.38 or more and 1.70 or less. When the refractive index of the third layer formed on the second layer is denoted by n3, the following conditional equations can be satisfied.

$$1.35 \le n1 \le 1.78 \quad (2)$$

$$1.78 \le n2 \le 2.40 \quad (3)$$

$$1.38 \le n3 \le 1.70 \quad (4)$$

The optical thickness of the first layer may be 25 nm or more and 65 nm or less, the optical thickness of the second layer may be 18 nm or more and 65 nm or less, and the optical thickness of the third layer is preferably 75 nm or more and 120 nm or less. When the physical thickness of the first layer is denoted by d1 (nm) and the physical thickness of the second layer is denoted by d2 (nm), the following conditional equations can be satisfied. The equation (7) is established when there is no homogeneous portion.

$$25 \le n1d1 \le 65 \quad (5)$$

$$18 \le n2d2 \le 65 \quad (6)$$

$$75 \le n3d3 \le 130 \quad (7)$$

When the fine undulation structure contains a homogeneous portion, the sum of the optical thickness of the homogeneous portion and the optical thickness of the third layer may be 75 nm or more and 120 nm or less. The following conditional equations can be satisfied where d3 (nm) denotes a physical thickness of the third layer, na denotes a refractive index of the homogeneous portion, and da (nm) denotes a physical thickness of the homogeneous portion.

$$1.35 \le na \le 1.58 \quad (8)$$

$$75 \le n3d3 + nada \le 130 \quad (9)$$

This is because the homogeneous portion can be a replacement of the third layer or a combination of the homogeneous portion and the third layer may serve as the third layer. Therefore, the refractive index difference between the homogeneous portion and the third layer can be 0.1 or less or more preferably 0.05 or less. The following conditional equations can be satisfied.

$$0 \le |n3 - na| \le 0.1 \quad (10)$$

$$0 \le |n3 - na| \le 0.05 \quad (11)$$

A material of each sub-layer in the intermediate layer 20 is not limited, and may use a metal oxide such as $SiO_2$, $MgO_2$, $Al_2O_3$, MgO, $ZrO_2$, $HfO_2$, $Ta_2O_5$, $TiO_2$, metal fluoride such as $LaF_3$, $CeF_3$, $MgF_2$, $NdF_3$, and $CaF_2$, or their compound.

Depending on the material of the substrate 10, a substance emerges on the surface exposed to the atmosphere and causes tarnish. One solution for this problem is to use $Al_2O_3$ for the first layer. The third layer may be a film that is less responsive and stable in the atmosphere, and can use $SiO_2$, for example.

The refractive index difference in the interface between the fine undulation structure 30 and the intermediate layer 20 (i.e.

the refractive index difference between the third layer and the root section of the fine undulation structure 30 or the refractive index difference between the third layer and the homogeneous portion) may be 0.1 or less, or more preferably 0.05 or less. This configuration can suppress a reflected wave produced in the interface of the fine undulation structure 30 and the intermediate layer 20, and the antireflection performance thus increases.

Optical elements to which the antireflection coating 100 is applicable include a lens, a prism, a fly-eye integrator, and the like. An optical system containing the optical element includes an imaging optical system, a scanning optical system, and a projection optical system, and can be used in an optical apparatus such as a still camera, a video camera, binoculars, a copier, a printer, a projector, and a head-mount display or the like.

First Embodiment

Figure 2A:
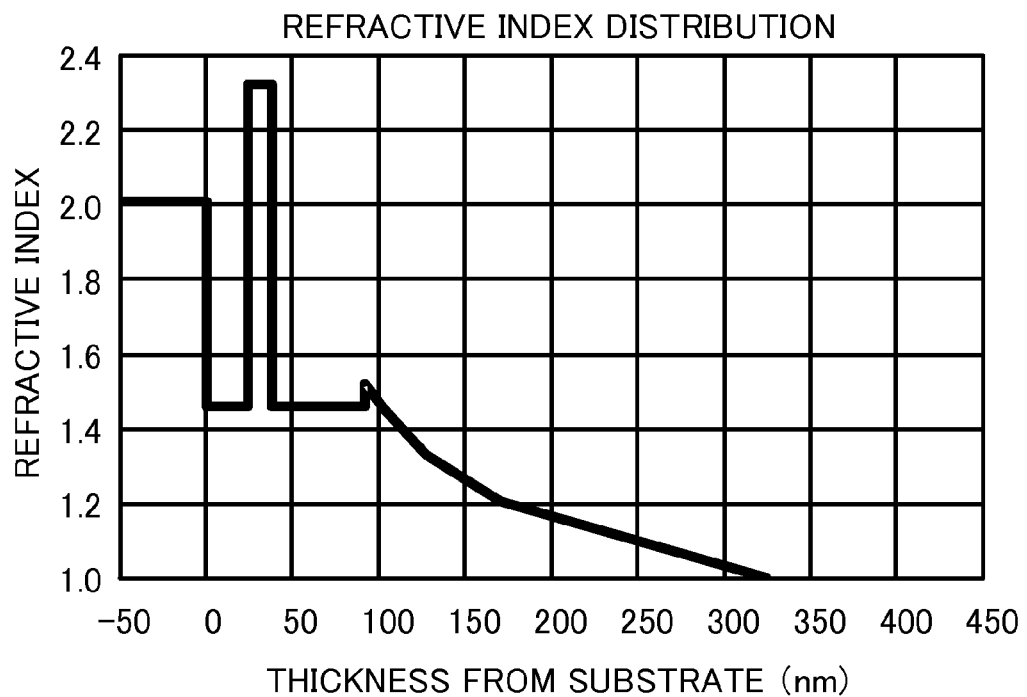
FIGS. 2A and 2B are graphs of a refractive index distribution and a reflectance characteristic, respectively, of an antireflection coating according to a first embodiment of the present invention.

FIG. 2A is a graph illustrating a refractive index distribution of an antireflection coating 100 according to a first embodiment. The abscissa axis is a thickness (nm) from a surface of a substrate 10 and the ordinate axis is a refractive index. The abscissa and ordinate axes in other embodiments are similarly defined. A region where the thickness from the surface of the substrate is 0 or less corresponds to the substrate 10. Table 1 summarizes a configuration of the antireflection coating 100 according to the first embodiment. In Table 1, n denotes a refractive index, d denotes a physical thickness, and nd (n×d) denotes an optical thickness. These notations are applicable to corresponding tables in other embodiments.

TABLE 1

|  |  | n | d(nm) | nd |
|---|---|---|---|---|
| Fine Undulation structure | undulation portion | 1 –> 1.52 | 221 | — |
|  | homogeneous portion |  |  |  |
| Intermediate layer | third layer | 1.46 | 54 | 79 |
|  | second layer | 2.32 | 14 | 33 |
|  | first layer | 1.46 | 24 | 35 |
| Optical substrate |  | 2.01 | — | — |

The antireflection coating 100 according to the first embodiment is formed on the substrate 10 with a refractive index of 2.01. The intermediate layer 20 includes, in order from the substrate, a first layer that has a physical thickness of 24 nm, is made of $SiO_2$ as its primary ingredient, and has a refractive index of 1.46, a second layer that has a physical thickness of 14 nm, is made of $TiO_2$ as its primary ingredient, and has a refractive index of 2.32, and a third layer that has a physical thickness of 54 nm, is made of $SiO_2$ as its primary ingredient, and has a refractive index of 1.46. Each sub-layer of the intermediate layer 20 is formed by the vacuum evaporation method. The antireflection coating according to the first embodiment reduces the manufacturing cost by decreasing the number of filming materials by using the same material for the first layer and the third layer. The optical thicknesses of the first layer, the second layer, and the third layer in the intermediate layer 20 are 35 nm, 33 nm, and 79 nm, respectively.

The fine undulation structure 30 is formed by applying warm water dipping treatment to a film which has, as its primary ingredient, aluminum oxide deposited by spin coating under the sol-gel method. The refractive index of the fine undulation structure 30 continuously increases from 1 up to 1.52 from the light incident side to the substrate side. A refractive index change in the thickness direction is not constant. In this structure, a refractive index change rate for the thickness is small in the region close to the light incident side than that in the region close to the substrate. This structure is not indispensable but can provide a good antireflection characteristic with respect to the wavelength band characteristic and incident angle characteristic.

Figure 2B:
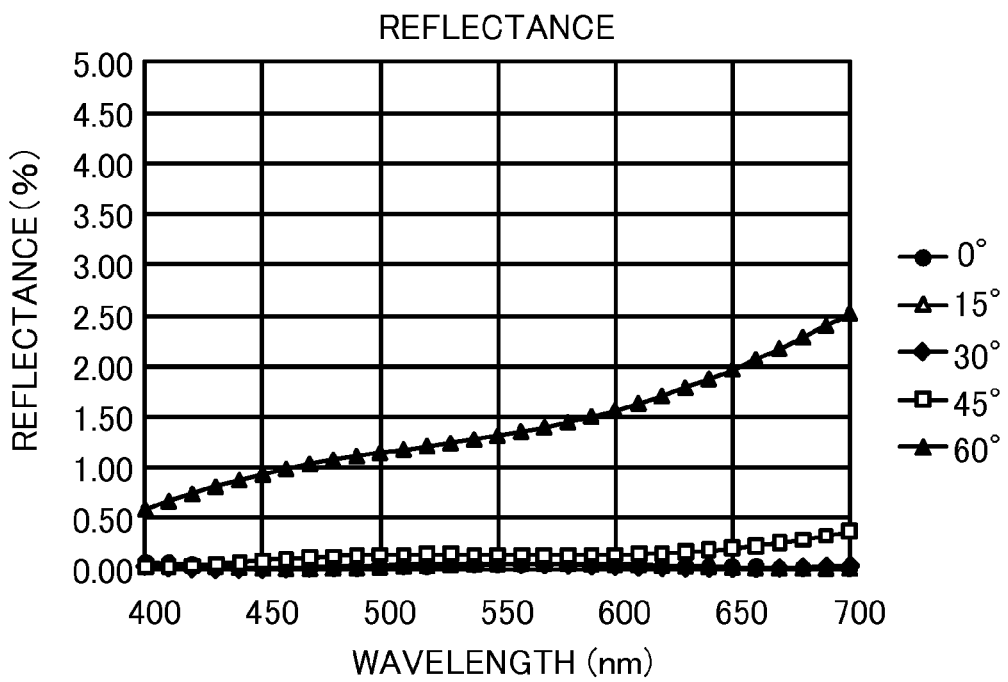

FIG. 2B is a graph of a reflectance characteristic of the antireflection coating 100 according to the first embodiment. The abscissa axis is a wavelength, the ordinate axis is a refractive index, and 0°, 15°, . . . , 60° represent incident angles. The ordinate and abscissa axes and the like in corresponding figures in other embodiments are similarly defined. It is understood from FIG. 2B that this embodiment achieves a reflectance of 0.2% or less throughout the overall visible range for the incident angle range from 0° to 45° and provides a high antireflection performance.

Second Embodiment

Figure 3A:
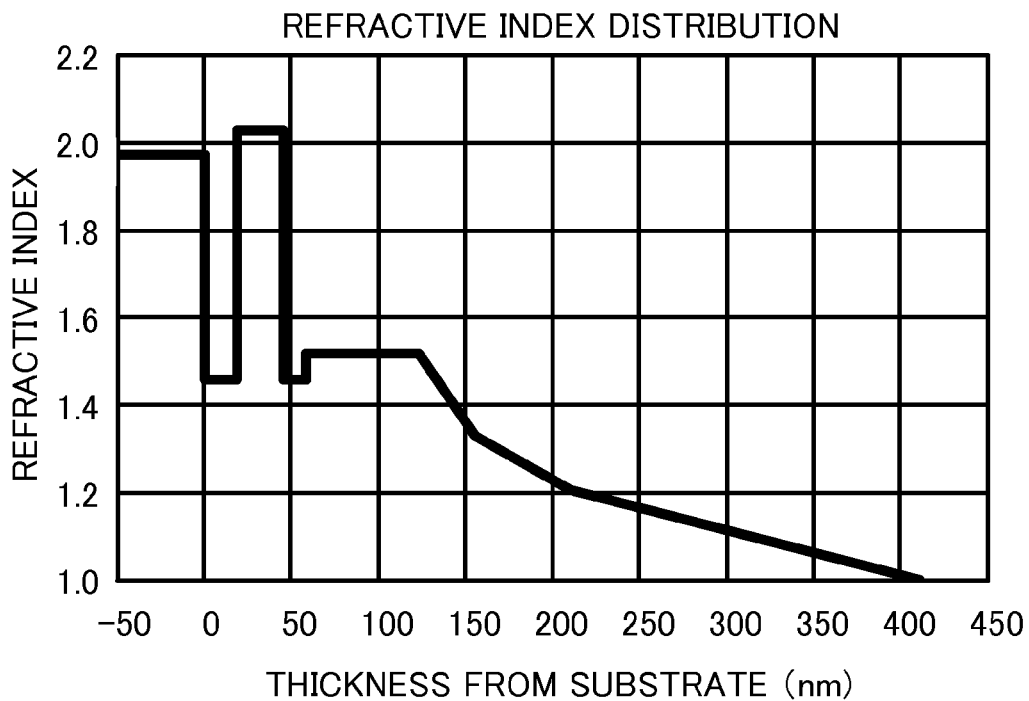
FIGS. 3A and 3B are graphs of a refractive index distribution and a reflectance characteristic, respectively, of an antireflection coating according to a second embodiment of the present invention.

FIG. 3A is a graph illustrating a refractive index distribution of an antireflection coating 100 according to a second embodiment. Table 2 summarizes a configuration of the antireflection coating 100 according to the second embodiment.

TABLE 2

| | | n | d(nm) | nd |
|---|---|---|---|---|
| Fine Undulation structure | undulation portion | 1 -> 1.52 | 288 | — |
| | homogeneous portion | 1.52 | 49 | 75 |
| Intermediate layer | third layer | 1.46 | 13 | 19 |
| | second layer | 2.03 | 27 | 55 |
| | first layer | 1.46 | 19 | 28 |
| Optical substrate | | 1.97 | — | — |

The antireflection coating 100 according to the second embodiment is formed on the substrate 10 with a refractive index of 1.97. The intermediate layer 20 includes, in order from the substrate, a first layer that has a physical thickness of 19 nm, is made of $SiO_2$ as its primary ingredient, and has a refractive index of 1.46, a second layer that has a physical thickness of 27 nm, is made of $Ta_2O_5$ as its primary ingredient, and has a refractive index of 2.03, and a third layer that has a physical thickness of 13 nm, is made of $SiO_2$ as its primary ingredient, and has a refractive index of 1.46. Each layer of the intermediate layer 20 is formed by the sputtering method. The optical thicknesses of the first layer, the second layer, and the third layer of the intermediate layer 20 are 28 nm, 55 nm, and 19 nm, respectively. A homogeneous portion remains under the fine undulation structure 30. The refractive index of the fine undulation structure 30 continuously increases from 1 up to 1.52 from the light incident side to the substrate side. The homogeneous portion has a physical thickness of 49 nm, a refractive index of 1.52, and an optical thickness of 75 nm. The sum of the optical thickness of the homogeneous portion and the optical thickness of the third layer is 94 nm.

Figure 3B:
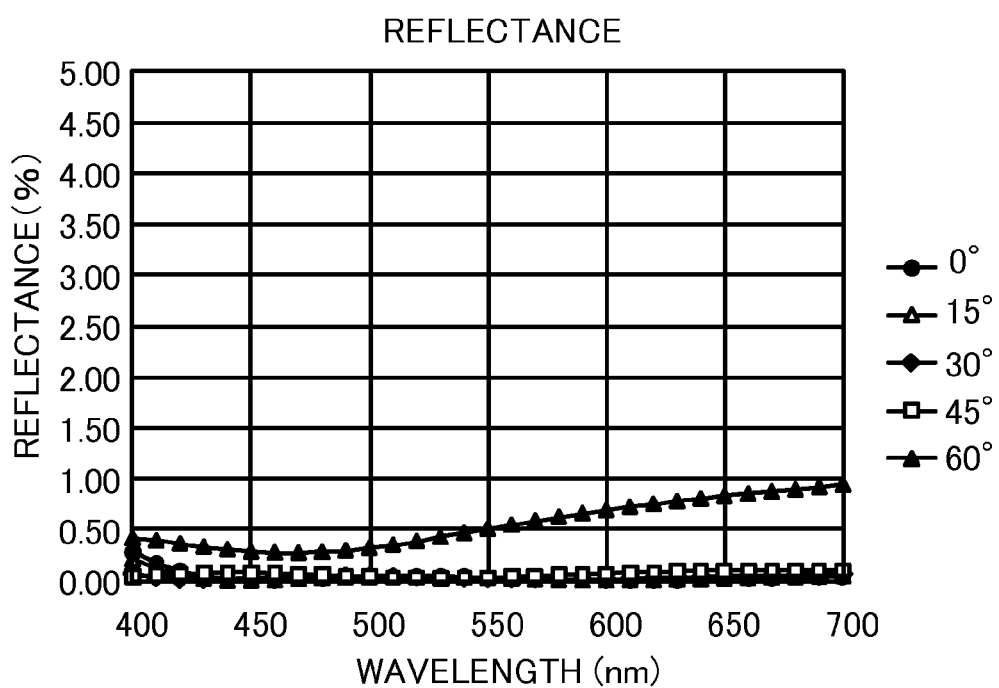

FIG. 3B is a graph of a reflectance characteristic of the antireflection coating 100 according to the second embodiment. It is understood from FIG. 3B that this embodiment provides a high antireflection performance throughout the overall visible range from wavelength 400 nm to 700 nm. This embodiment achieves a reflectance of 0.3% or less throughout the overall visible range at the incident angle from 0° to 45° and has a particularly good oblique-incidence characteristic of 1.0% or less over the overall visible range for an incident angle of 60°.

Even this embodiment in which a homogeneous portion remains under the fine undulation structure 30 can achieve a high antireflection performance by optimizing the thickness of the intermediate layer 20, in particular the thickness of the third layer. The antireflection coating 100 can also achieve a higher antireflection performance by controlling the thickness and refractive index of the remaining homogeneous portion.

Comparative Example 1

Figure 12A:
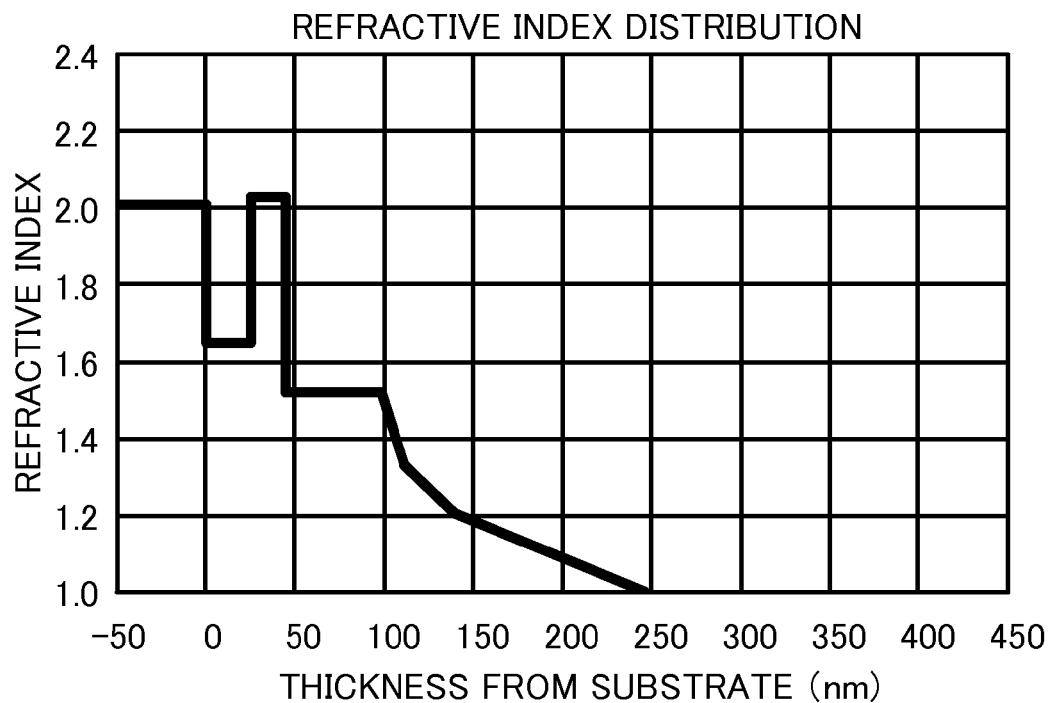
FIGS. 12A and 12B are graphs of a reflectance distribution and a reflectance characteristic, respectively, of an antireflection coating of a first comparative example.

FIG. 12A is a graph illustrating a refractive index distribution of an antireflection coating according to a first comparative example. Table A summarizes a configuration of the antireflection coating 100 according to the first comparative example.

TABLE A

| | | n | d(nm) | nd |
|---|---|---|---|---|
| Fine Undulation structure | undulation portion | 1 -> 1.52 | 148 | — |
| | homogeneous portion | | | |
| Intermediate layer | third layer | 1.52 | 45 | 68 |
| | second layer | 2.03 | 20 | 41 |
| | first layer | 1.65 | 25 | 41 |
| Optical substrate | | 2.01 | — | — |

In the first comparative example, a substrate has the same feature as that in the first embodiment and has a refractive index of 2.01. An intermediate layer has a first layer that has a physical thickness of 25 nm, is made of $Al_2O_3$ as its primary ingredient, and has a refractive index of 1.65, a second layer that has a physical thickness of 20 nm, is made of $Ta_2O_5$ as its primary ingredient, and has a refractive index of 2.03, and a third layer that has a physical thickness of 45 nm, is made of $Al_2O_3$ and $SiO_2$ as its primary ingredient, and has a refractive index of 1.52. A fine undulation structure has a physical thickness of 148 nm and its refractive index continuously increases from 1 up to 1.52 from the light incident side to the substrate side.

Figure 12B:
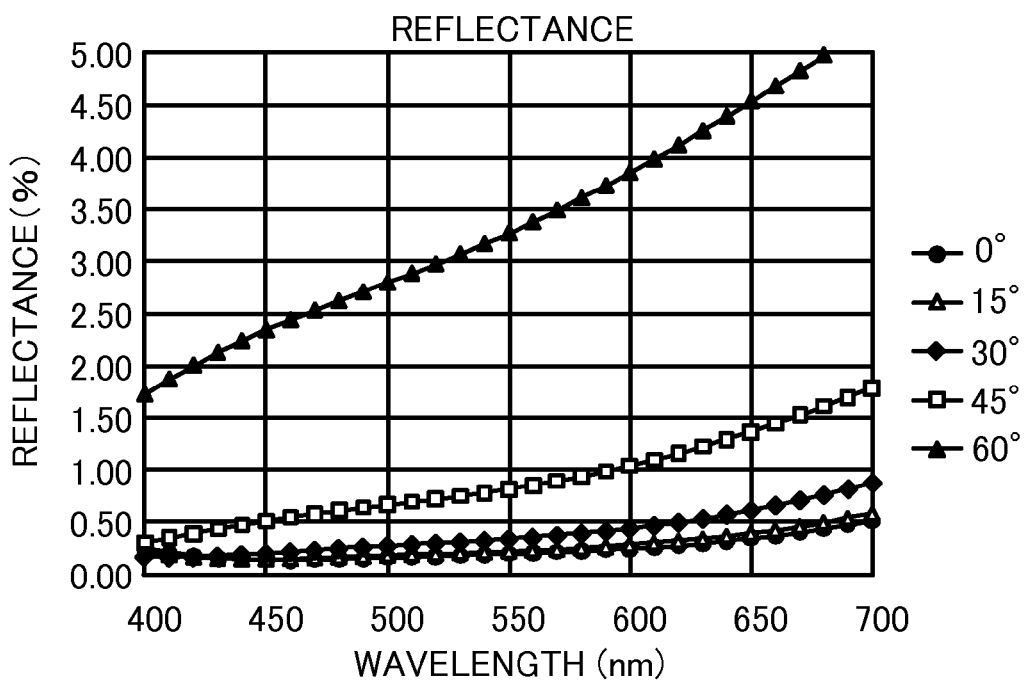

FIG. 12B is a graph illustrating reflectance characteristics of the antireflection coating of the first comparative example. As illustrated, the antireflection coating has a reflectance of 0.5% or more at a wavelength of 700 nm for an incident angle of 0° and its antireflection characteristic deteriorates as incident angle increases. In particular, the reflectance at a wavelength of 700 nm exceeds 5% for an incident angle of 60°.

When the thickness of the fine undulation structure is shorter than 180 nm, the antireflection characteristic deteriorates on the long wavelength side or for a large incident angle as illustrated. Hence, the thickness of the fine undulation structure may be 180 nm or longer.

Third Embodiment

FIG. 4A is a graph illustrating a refractive index distribution of an antireflection coating 100 according to a third embodiment. Table 3 summarizes a configuration of the antireflection coating 100 according to the third embodiment.

TABLE 3

|  |  | n | d(nm) | nd |
|---|---|---|---|---|
| Fine Undulation structure | undulation portion | 1 –> 1.52 | 221 | — |
|  | homogeneous portion | 1.52 | 56 | 85 |
| Intermediate layer | third layer | 1.46 | 0 | 0 |
|  | second layer | 2.03 | 20 | 41 |
|  | first layer | 1.63 | 25 | 41 |
| Optical substrate |  | 2.01 | — | — |

The antireflection coating 100 according to the third embodiment is formed on the substrate 10 with a refractive index of 2.01. The intermediate layer 20 includes, in order from the substrate, a first layer that has a physical thickness of 25 nm, is made of $Al_2O_3$ as its primary ingredient, and has a refractive index of 1.65, and a second layer that has a physical thickness of 20 nm, is made of $Ta_2O_5$ as its primary ingredient, and has a refractive index of 2.03. The intermediate layer 20 according to the third embodiment does not include a third layer. The optical thicknesses of the first layer and the second layer of the intermediate layer 20 are 41 nm and 41 nm, respectively. The fine undulation structure 30 is formed as in the first embodiment. A homogeneous portion, however, remains under the fine undulation structure 30. The homogeneous portion has a refractive index of 1.52, a physical thickness of 56 nm, and an optical thickness of 85 nm. The sum of the optical thickness of the homogeneous portion and the optical thickness of the third layer is 85 nm.

FIG. 4B is a graph of a reflectance characteristic of the antireflection coating 100 according to the third embodiment. It is understood from FIG. 4B that this embodiment provides a high antireflection performance in the overall visible range (from wavelength 400 nm to 700 nm). This embodiment achieves a reflectance of 0.2% or less over the overall visible range for incident angles of 0° to 45° and has particularly good oblique-incidence characteristics of 1.8% or less over the overall visible range even for an incident angle of 60. Although the homogeneous portion remains and the intermediate layer has the two-layer structure, this embodiment achieves a high reflectance performance equivalent to that of the three-layer structure.

The reflectance of the antireflection coating 100 does not significantly deteriorate even if the thickness varies. FIG. 4C illustrates a reflectance characteristic when each sub-layer becomes thicker by 10%. The fine undulation structure 30 has a physical thickness of 243 nm and respective sub-layers in the intermediate layer 20 has, in order from the substrate, physical thicknesses of 28 nm, 22 nm, and 62 nm, respectively. The 10%-thicker sub-layers cause little changes, and rather demonstrate an improvement for an incident angle of 60°. FIG. 4D shows a reflectance characteristic when each sub-layer becomes thinner by 10%. The fine undulation structure 30 has a physical thickness of 199 nm and each sub-layer in the intermediate layer 20 has, in order from the substrate side, physical thicknesses of 23 nm, 18 nm, and 50 nm, respectively. The 10%-thinner sub-layers maintain the antireflection characteristic although the reflectance performance slightly increases on the long wavelength (up to 700 nm) side for an incident angle of 45° and more.

Comparative Example 2

Figure 13A:
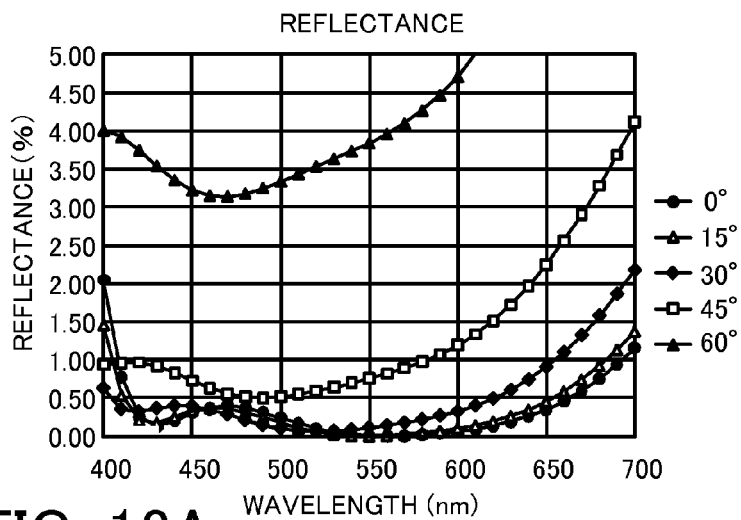
FIGS. 13A, 13B and 13C are graphs of reflectance characteristics of an antireflection coating of a second comparative example.

FIG. 13A is a graph of a reflectance characteristic of an antireflection coating according to a second comparative example, which is an antireflection coating disclosed in JP 2010-271404. The computation in the second comparative example may contain slight errors because the refractive index diffusions of the substrate and each film are not considered, and values of this example are slightly higher than those disclosed in JP 2010-271404. The reflectance for normally incident light is 0.5% or less in a wavelength range from 450 nm to 650 nm, which is higher than that of the antireflection coating according to the present invention.

Figure 13B:
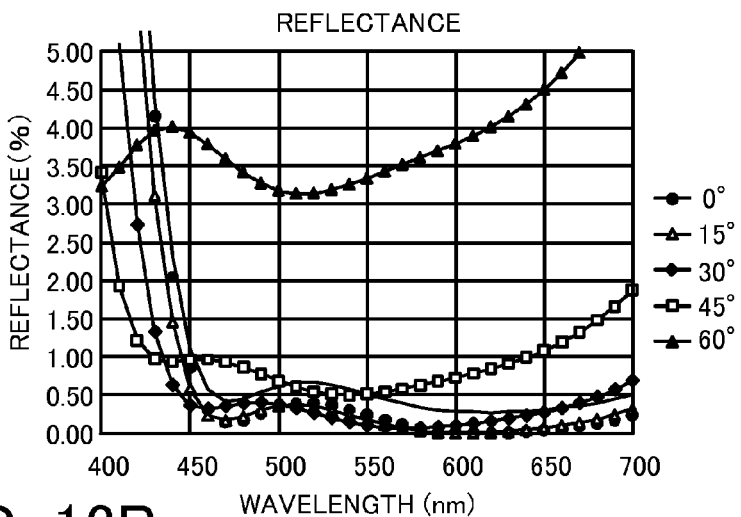
Figure 13C:
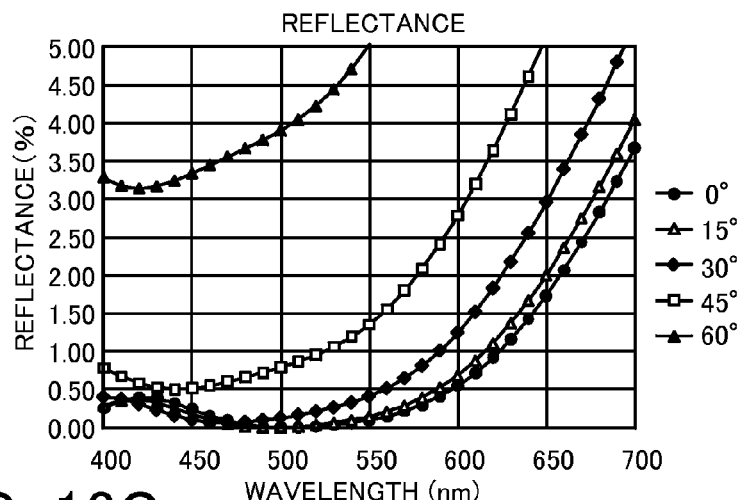

FIG. 13B is a graph illustrating the reflectance characteristic when each sub-layer becomes thicker by 10% or when the physical thicknesses of the first layer, the second layer, the third layer, the fourth layer, and the fifth layer are 16 nm, 56 nm, 28 nm, 157 nm, and 103 nm, respectively. FIG. 13C is a graph of a reflectance characteristic when each sub-layer becomes thinner by 10%, or when the physical thicknesses of the first layer, the second layer, the third layer, the fourth layer, and the fifth layer are 13 nm, 46 nm, 23 nm, 129 nm, and 84 nm, respectively. It is understood from FIGS. 13A and 13B that the reflectance characteristic according to the first embodiment is less likely fluctuate when the thickness changes by ±10% and does not deteriorate significantly even if the thickness varies. In other words, the first embodiment has a wider tolerance for the thickness variation.

Fourth Embodiment

Figure 5A:
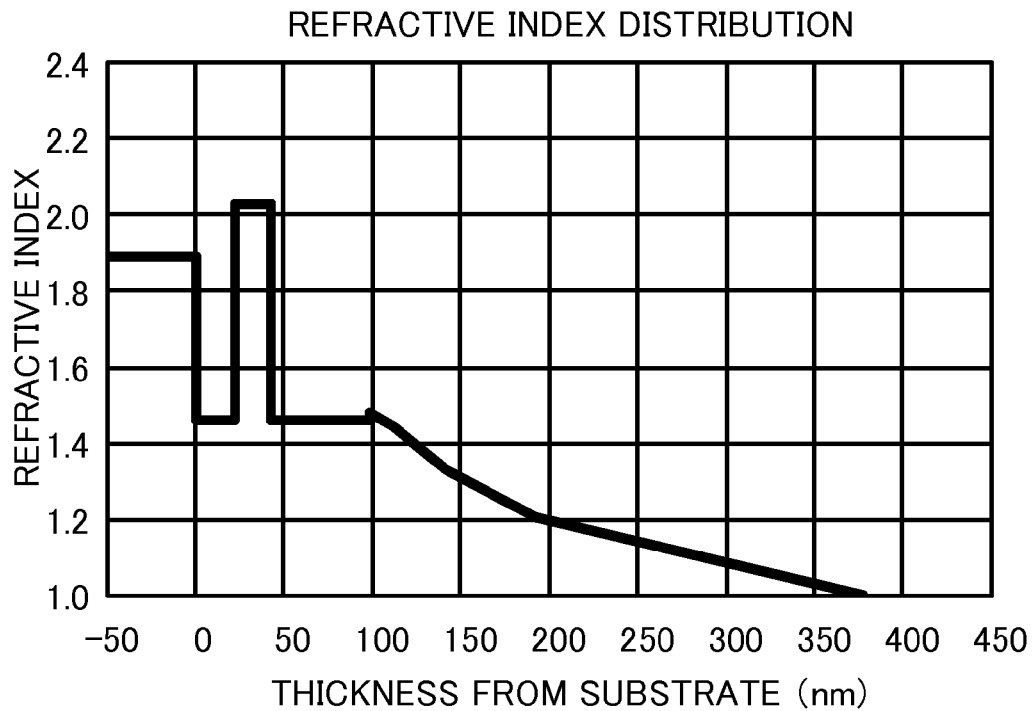
FIGS. 5A and 5B are graphs of a refractive index distribution and a reflectance characteristic, respectively, of an antireflection coating according to a fourth embodiment of the present invention.

FIG. 5A is a graph of a refractive index distribution of an antireflection coating 100 according to a fourth embodiment. Table 4 summarizes a configuration of the antireflection coating 100 according to the fourth embodiment.

TABLE 4

|  |  | n | d(nm) | nd |
|---|---|---|---|---|
| Fine Undulation structure | undulation portion | 1 –> 1.48 | 266 | — |
|  | homogeneous portion |  |  |  |
| Intermediate layer | third layer | 1.46 | 56 | 82 |
|  | second layer | 2.03 | 20 | 41 |
|  | first layer | 1.46 | 22 | 32 |
| Optical substrate |  | 1.89 | — | — |

The antireflection coating 100 according to the fourth embodiment is formed on the substrate 10 with a refractive index of 1.89. The intermediate layer 20 includes, in order from the substrate, a first layer that has a physical thickness of 22 nm, is made of $SiO_2$ as its primary ingredient, and has a refractive index of 1.46, a second layer that has a physical thickness of 20 nm, is made of $Ta_2O_5$ as its primary ingredient, and has a refractive index of 2.03, and a third layer that has a physical thickness of 56 nm, is made of $SiO_2$ as its primary ingredient, and has a refractive index of 1.46. The fine undulation structure 30 has a thick physical thickness of 266 nm and its refractive index continuously increases from 1 to 1.48 from the light incident side to the substrate side.

Figure 5B:
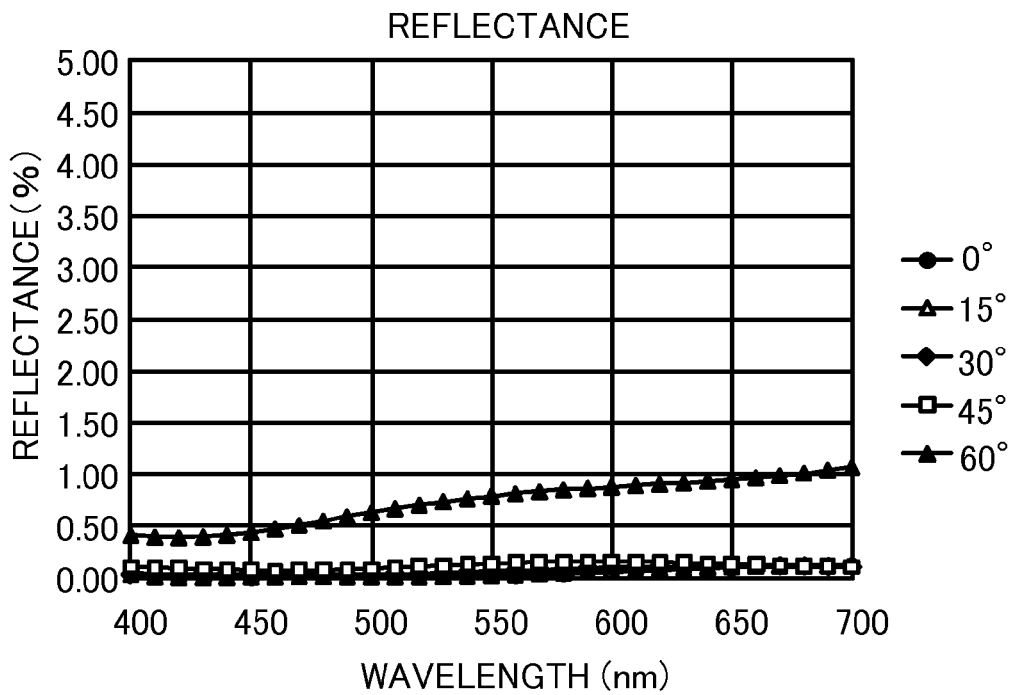

FIG. 5B is a graph illustrating reflectance characteristics of the antireflection coating 100 according to the fourth embodiment. It is understood from FIG. 5B that this embodiment provides a high antireflection performance in the overall visible range from wavelength 400 nm to 700 nm. Since the fine undulation structure is thick in this embodiment, the antireflection coating has a good antireflection performance at a high incident angle and achieves an excellent reflectance of 1.2% or less over the overall visible range for an incident angle of 60°.

Fifth Embodiment

Figure 6A:
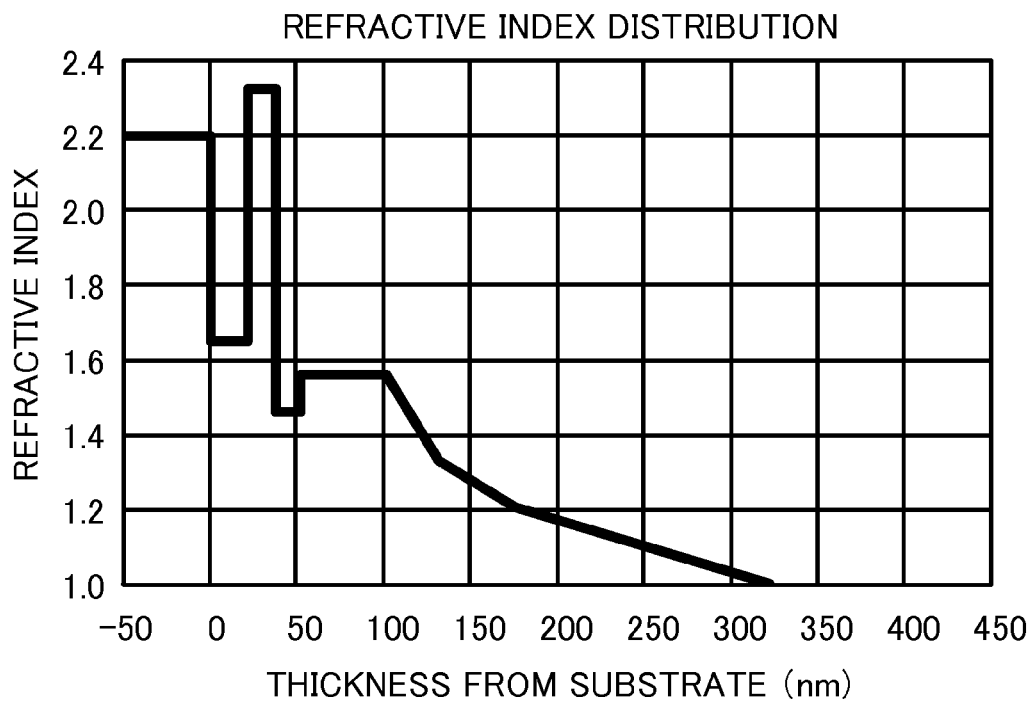
FIGS. 6A and 6B are graphs of a refractive index distribution and a reflectance characteristic, respectively, of an antireflection coating according to a fifth embodiment of the present invention.

FIG. 6A is a graph of a refractive index distribution of an antireflection coating 100 according to a fifth embodiment. Table 5 summarizes a configuration of the antireflection coating 100 according to the fifth embodiment.

TABLE 5

|  |  | n | d(nm) | nd |
|---|---|---|---|---|
| Fine Undulation structure | undulation portion | 1 –> 1.56 | 221 | — |
|  | homogeneous portion | 1.56 | 38 | 59 |
| Intermediate layer | third layer | 1.46 | 14 | 20 |
|  | second layer | 2.32 | 16 | 37 |
|  | first layer | 1.65 | 22 | 36 |
| Optical substrate |  | 2.20 | — | — |

The antireflection coating 100 according to the fifth embodiment is formed on the substrate 10 with a high refractive index of 2.20. The intermediate layer 20 includes, in order from the substrate, a first layer that has a physical thickness of 22 nm, is made of $Al_2O_3$ as its primary ingredient, and has a refractive index of 1.65, a second layer that has a physical thickness of 16 nm, is made of $TiO_2$ as its primary ingredient, and has a refractive index of 2.32, and a third layer that has a physical thickness of 56 nm, is made of $SiO_2$ as its primary ingredient, and has a refractive index of 1.46. The optical thicknesses of the first layer, the second layer, and the third layer of the intermediate layer 20 are 36 nm, 37 nm, and 20 nm, respectively. A fine undulation structure 30 has a physical thickness of 221 nm and refractive index which continuously increases from 1 to 1.56 from the light incident side to the substrate side. A homogeneous portion remains under the fine undulation structure 30. The homogeneous portion has a refractive index of 1.56, a physical thickness of 38 nm, and an optical thickness of 59 nm. The sum of the optical thickness of the homogeneous portion and the optical thickness of the third layer is 79 nm.

Figure 6B:
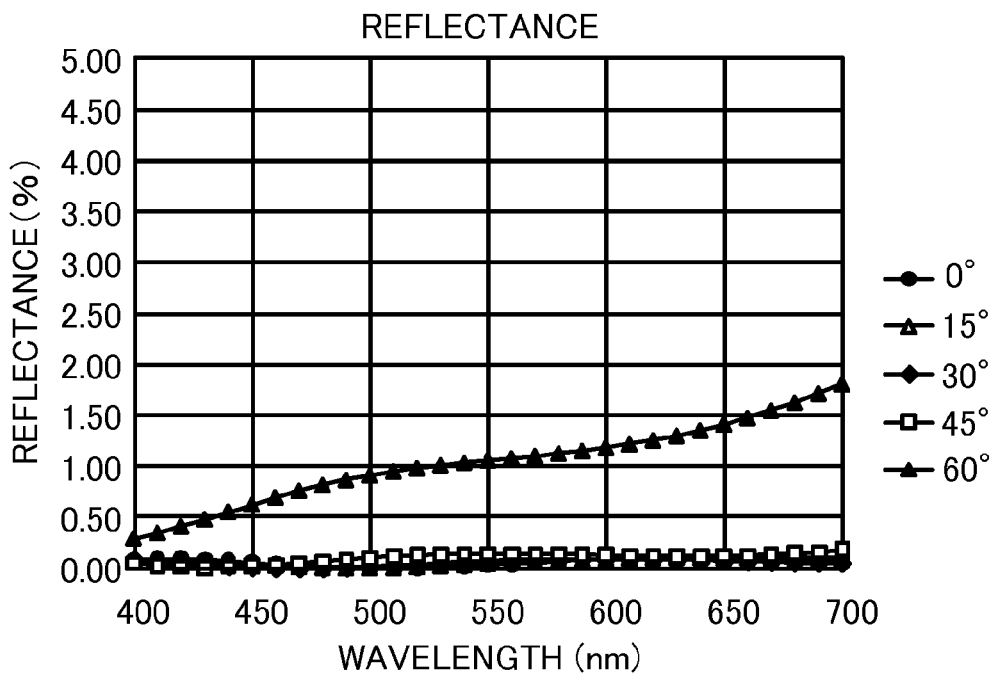

FIG. 6B is a graph of a reflectance characteristic of the antireflection coating 100 according to the fifth embodiment. It is understood from FIG. 6B that although the substrate has a high refractive index of 2.2, the antireflection coating 100 according to the fifth embodiment provides a high antireflection performance in the overall visible range from wavelength 400 nm to 700 nm. It is understood from FIG. 6B that this embodiment achieves a reflectance of 0.2% or less over the overall visible range for incident angles of from 0° to 45° and has an excellent oblique-incidence characteristic of 1.9% or less over the overall visible range even for an incident angle of 60°.

Sixth Embodiment

Figure 7A:
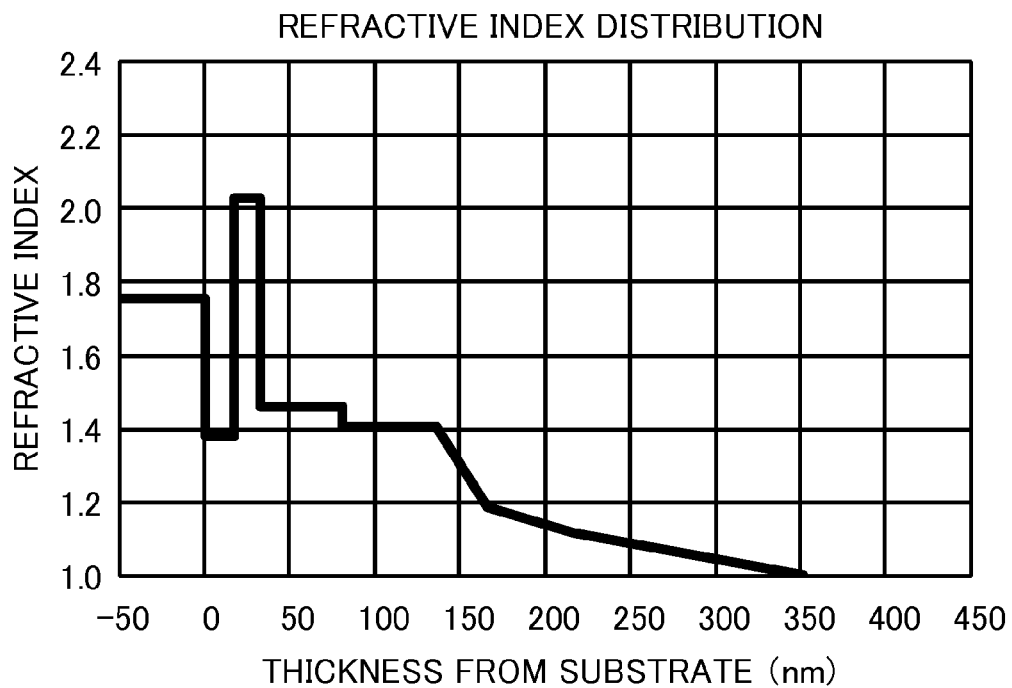
FIGS. 7A and 7B are graphs of a refractive index distribution and a reflectance characteristic, respectively, of an antireflection coating according to a sixth embodiment of the present invention.

FIG. 7A is a graph illustrating a refractive index distribution of an antireflection coating 100 according to a sixth embodiment. Table 6 summarizes a configuration of the antireflection coating 100 according to the sixth embodiment.

TABLE 6

|  |  | n | d(nm) | nd |
|---|---|---|---|---|
| Fine Undulation structure | undulation portion | 1 –> 1.40 | 216 | — |
|  | homogeneous portion | 1.40 | 41 | 57 |
| Intermediate layer | third layer | 1.46 | 48 | 70 |
|  | second layer | 2.03 | 15 | 30 |
|  | first layer | 1.38 | 18 | 25 |
| Optical substrate |  | 1.75 | — | — |

The antireflection coating 100 according to the sixth embodiment is formed on the substrate 10 with a refractive index of 1.75. The intermediate layer 20 includes, in order from the substrate, a first layer that has a physical thickness of 18 nm, is made of $MgF_2$ as its primary ingredient, and has a refractive index of 1.38, a second layer that has a physical thickness of 15 nm, is made of $Ta_2O_5$ as its primary ingredient, and has a refractive index of 2.03, and a third layer that has a physical thickness of 48 nm, is made of $SiO_2$ as its primary ingredient, and has a refractive index of 1.46. The optical thicknesses of the first layer, the second layer, and the third layer of the intermediate layer 20 are 25 nm, 31 nm, and 70 nm, respectively. The fine undulation structure 30 has a physical thickness of 216 nm and its refractive index continuously increases from 1 to 1.40 from the light incident side to the substrate. A homogeneous portion remains under the fine undulation structure 30. The homogeneous portion has a refractive index of 1.40, a physical thickness of 41 nm, and an optical thickness of 75 nm. The sum of the optical thickness of the homogeneous portion and the optical thickness of the third layer is 145 nm.

Figure 7B:
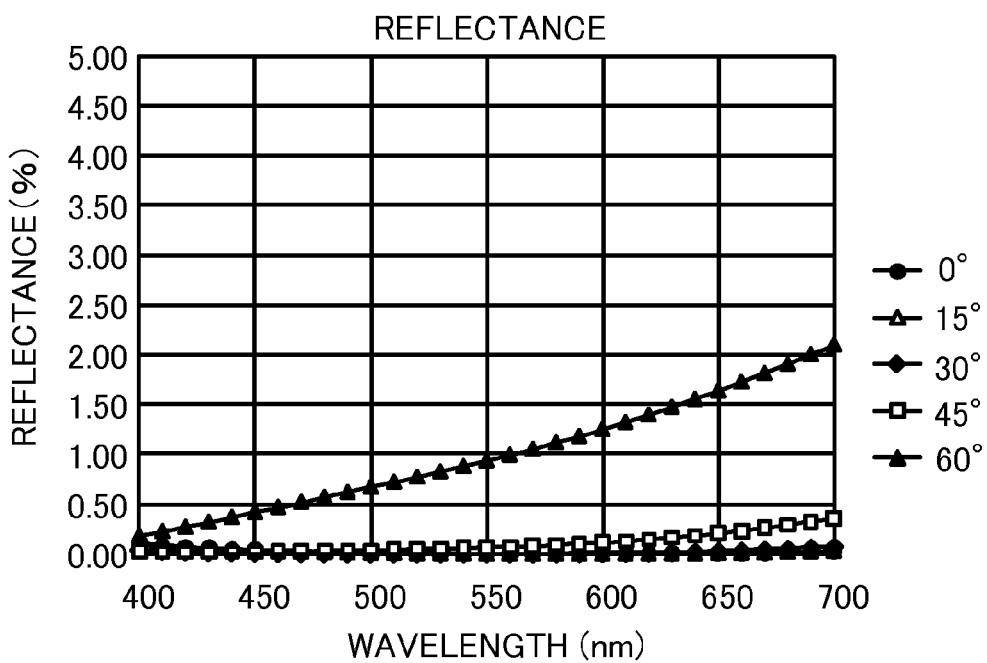

FIG. 7B is a graph of a reflectance characteristic of the antireflection coating 100 according to the sixth embodiment. It is understood that this embodiment provides a high antireflection performance in the overall visible range from wavelength 400 nm to 700 nm with a reflectance of 0.2% or less for an incident angle of 0° and a reflectance of 0.5% or less even for an incident angle of 45°.

Seventh Embodiment

Figure 8A:
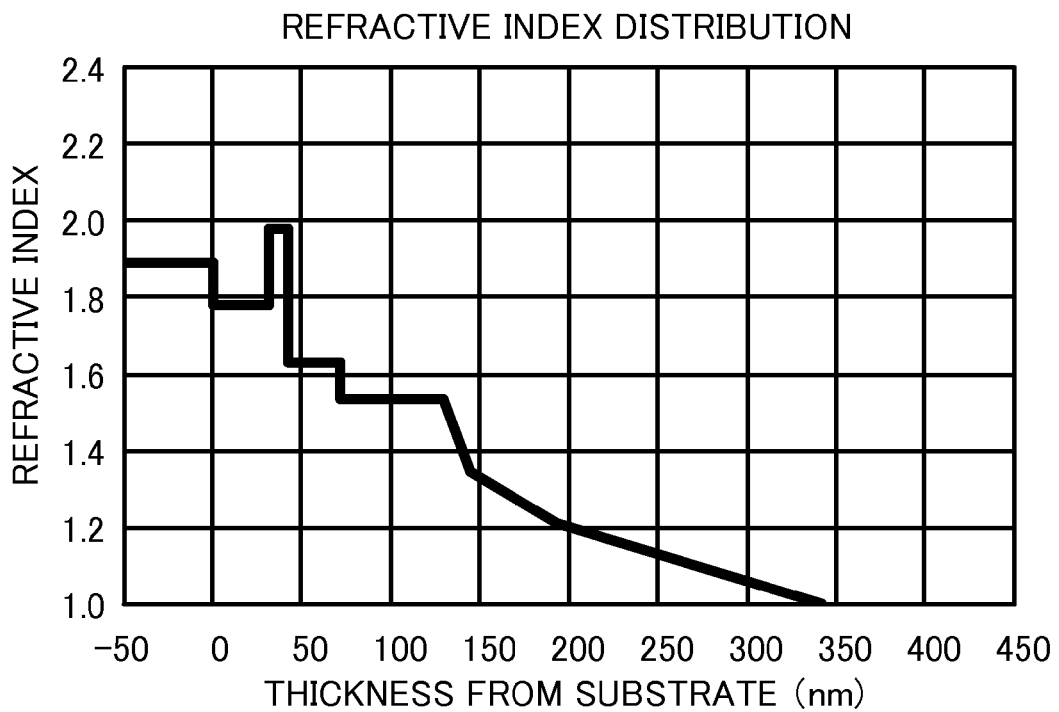
FIGS. 8A and 8B are graphs of a refractive index distribution and a reflectance characteristic, respectively, of an antireflection coating according to a seventh embodiment of the present invention.

FIG. 8A is a graph illustrating a refractive index distribution of an antireflection coating 100 according to a seventh embodiment. Table 7 summarizes a configuration of the antireflection coating 100 according to the seventh embodiment.

TABLE 7

|  |  | n | d(nm) | nd |
|---|---|---|---|---|
| Fine Undulation structure | undulation portion | 1 –> 1.53 | 216 | — |
|  | homogeneous portion | 1.53 | 39 | 60 |
| Intermediate layer | third layer | 1.63 | 30 | 49 |
|  | second layer | 1.98 | 10 | 20 |
|  | first layer | 1.78 | 32 | 57 |
| Optical substrate |  | 1.89 | — | — |

The antireflection coating 100 according to the seventh embodiment is formed on the substrate 10 with a refractive index of 1.89. In the intermediate layer 20, a first layer has a physical thickness of 32 nm, is made of a mixture of $ZrO_2$ and $Al_2O_3$ as its primary ingredient, and has a refractive index of 1.78. A second layer has a physical thickness of 10 nm, is made of a mixture of $ZrO_2$ and $Al_2O_3$ as its primary ingredient, and has a refractive index of 1.98. A third layer has a physical thickness of 30 nm, is made of $Al_2O_3$ as its primary ingredient, and has a refractive index of 1.63. The optical thicknesses of the first layer, the second layer, and the third layer of the intermediate layer 20 are 57 nm, 20 nm, and 49 nm, respectively. A fine undulation structure 30 has a physical thickness of 216 nm and refractive index which continuously increases from 1 to 1.53 from the light incident side toward the substrate side. A homogeneous portion remains under the fine undulation structure 30. The homogeneous portion has a refractive index of 1.53, a physical thickness of 39 nm, and an optical thickness of 60 nm. The sum of the optical thickness of the homogeneous portion and the optical thickness of the third layer is 109 nm.

Figure 8B:
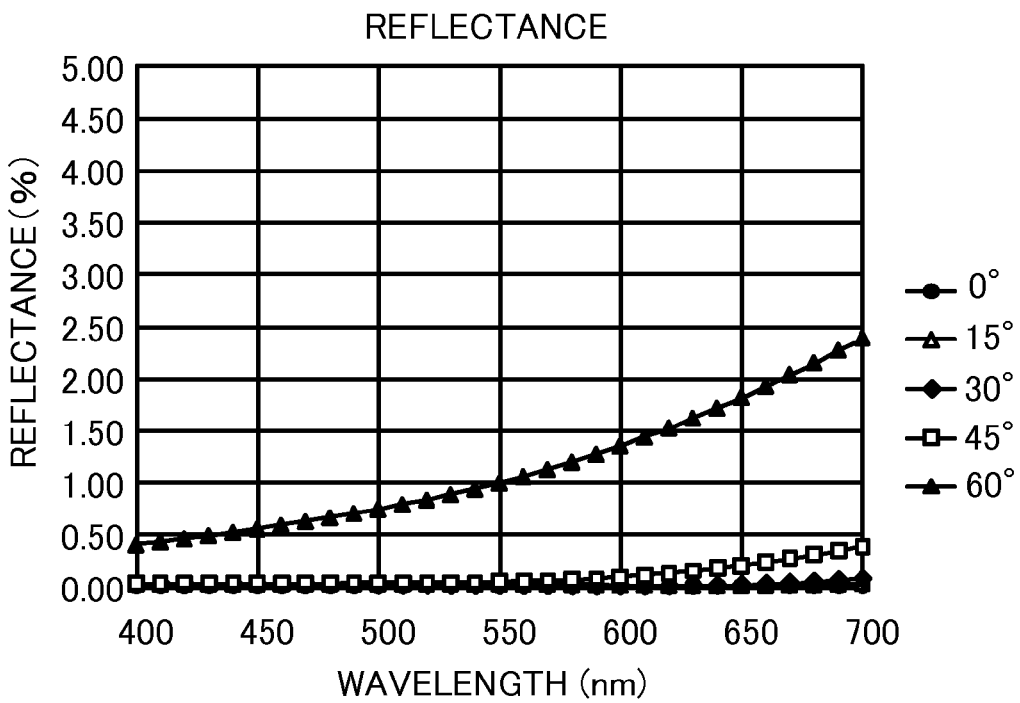

FIG. 8B is a graph of a reflectance characteristic of the antireflection coating 100 according to the seventh embodiment. It is understood from FIG. 8B that this embodiment provides a high antireflection performance in the overall visible range with a reflectance of 0.2% or less for an incident angle of 0° and a reflectance of 0.5% or less even for an incident angle of 45°.

Eighth Embodiment

Figure 9A:
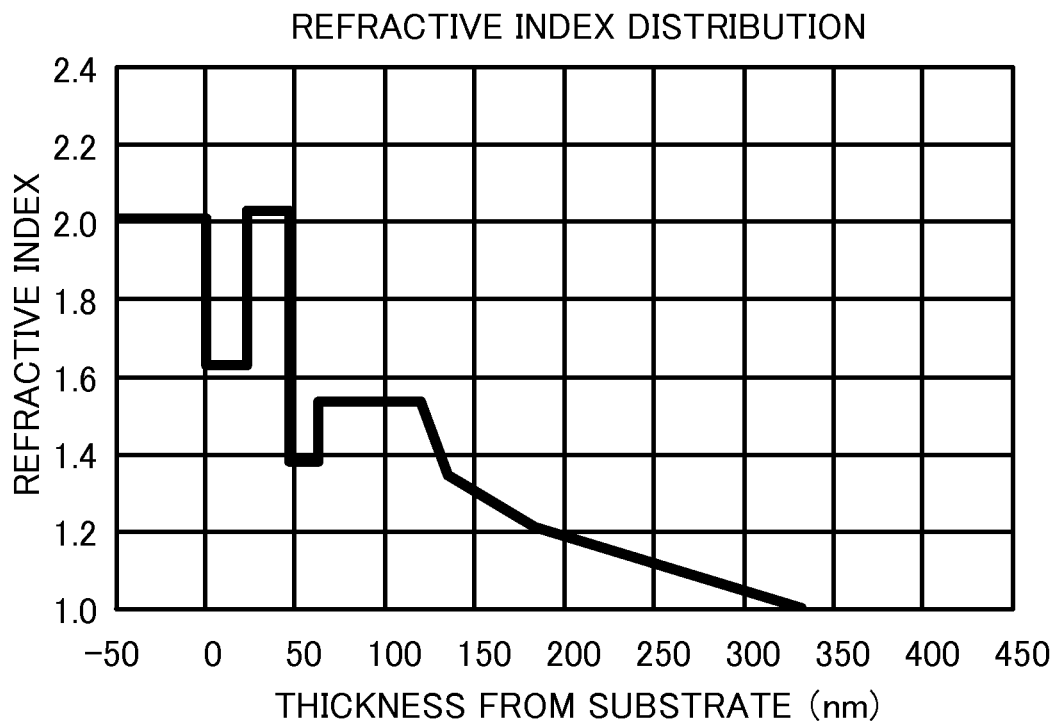
FIGS. 9A and 9B are graphs of a refractive index distribution and a reflectance characteristic, respectively, of an antireflection coating according to an eighth embodiment of the present invention.

FIG. 9A is a graph of a refractive index distribution of an antireflection coating 100 according to an eighth embodiment. Table 8 summarizes a configuration of the antireflection coating 100 according to the eighth embodiment.

TABLE 8

|  |  | n | d(nm) | nd |
|---|---|---|---|---|
| Fine Undulation structure | undulation portion | 1 -> 1.53 | 216 | — |
|  | homogeneous portion | 1.53 | 39 | 60 |
| Intermediate layer | third layer | 1.38 | 17 | 24 |
|  | second layer | 2.03 | 23 | 47 |
|  | first layer | 1.63 | 23 | 38 |
| Optical substrate |  | 2.01 | — | — |

The antireflection coating 100 according to the eighth embodiment is formed on the substrate 10 with refractive index of 2.01. The intermediate layer 20 includes, in order from the substrate, a first layer that has a physical thickness of 23 nm, is made of $Al_2O_3$ as its primary ingredient, and has a refractive index of 1.63, a second layer that has a physical thickness of 23 nm, is made of $Ta_2O_5$ as its primary ingredient, and has a refractive index of 2.03, and a third layer that has a physical thickness of 17 nm, is made of $MgF_2$ as its primary ingredient, and has a refractive index of 1.38. The optical thicknesses of the first layer, the second layer, and the third layer of the intermediate layer 20 are 24 nm, 47 nm, and 24 nm, respectively. A fine undulation structure 30 has a physical thickness of 216 nm and refractive index which continuously increases from 1 to 1.53 from the light incident side toward the substrate side. A homogeneous portion remains underneath the fine undulation structure 30. The homogeneous portion has a refractive index of 1.53, a physical thickness of 39 nm, and an optical thickness of 60 nm. The sum of the optical thickness of the homogeneous portion and the optical thickness of the third layer is 84 nm.

Figure 9B:
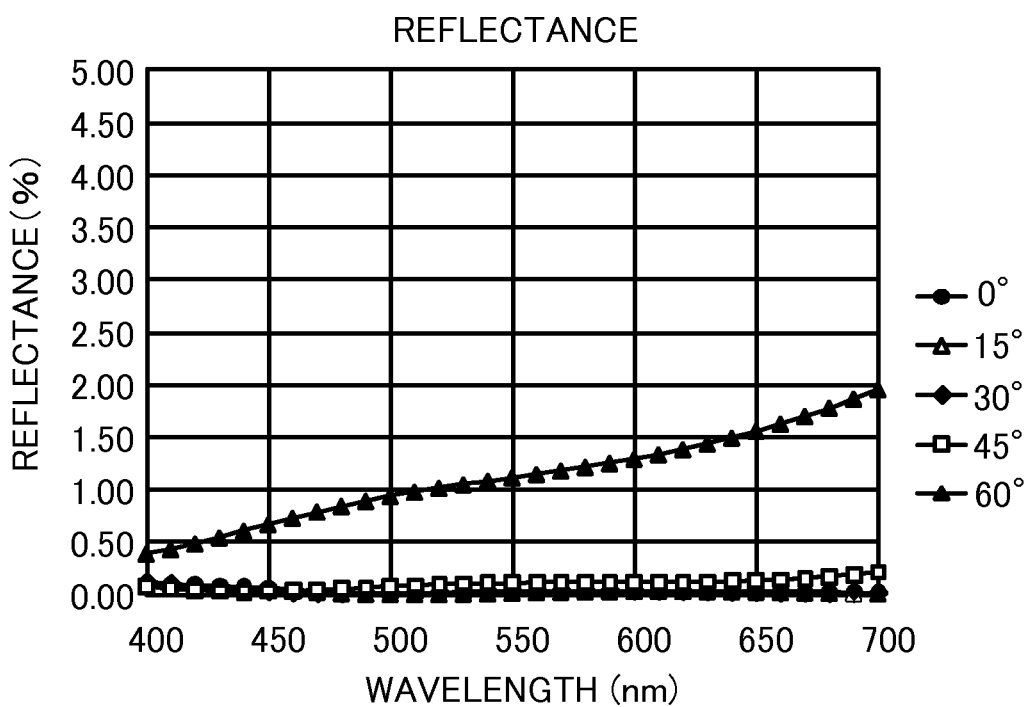

FIG. 9B is a graph illustrating reflectance characteristics of the antireflection coating 100 according to the eighth embodiment. FIG. 9B shows that the antireflection coating 100 according to the eighth embodiment provides a high reflectance performance in the overall visible range with a reflectance of 0.2% or less for an incident angle of 0° and a reflectance of 0.4% or less even for an incident angle of 45°.

Ninth Embodiment

Figure 10A:
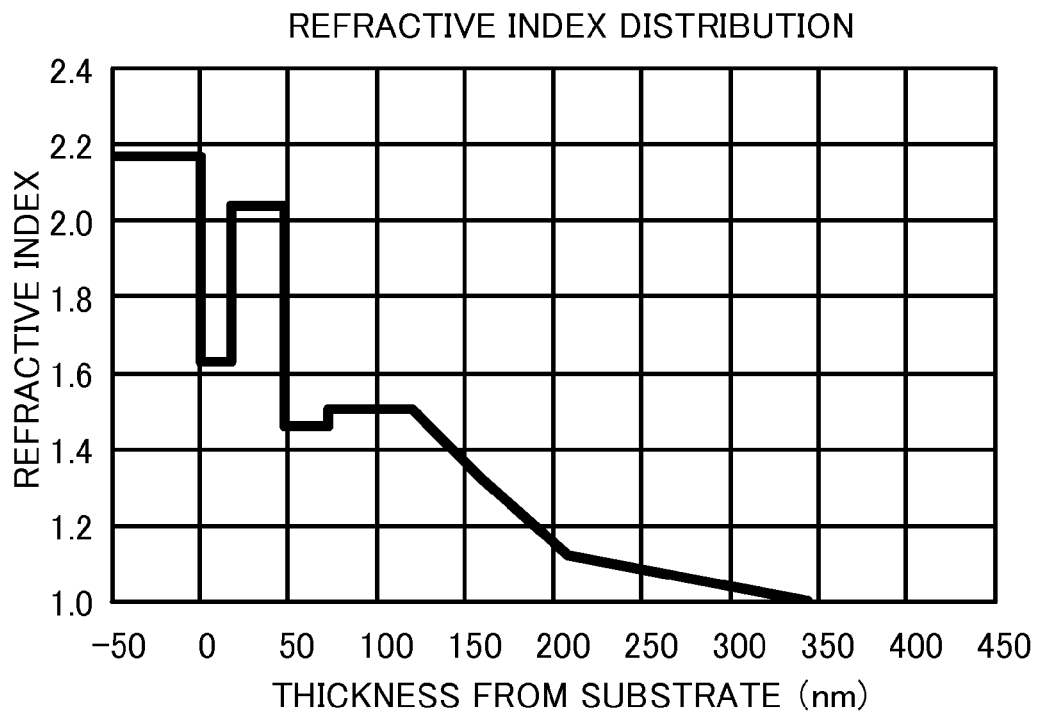
FIGS. 10A and 10B are graphs of a refractive index distribution and a reflectance characteristic, respectively, of an antireflection coating according to a ninth embodiment of the present invention.

FIG. 10A is a graph illustrating a refractive index distribution of an antireflection coating 100 according to a ninth embodiment. Table 9 summarizes a configuration of the antireflection coating 100 according to the ninth embodiment.

TABLE 9

|  |  | n | d(nm) | nd |
|---|---|---|---|---|
| Fine Undulation structure | undulation portion | 1 -> 1.50 | 224 | — |
|  | homogeneous portion | 1.50 | 34 | 51 |
| Intermediate layer | third layer | 1.46 | 25 | 37 |
|  | second layer | 2.04 | 30 | 61 |
|  | first layer | 1.63 | 18 | 29 |
| Optical substrate |  | 2.17 | — | — |

The antireflection coating 100 according to the ninth embodiment is formed on a substrate 10 with refractive index of 2.17. An intermediate layer 20 includes, in order from the substrate, a first layer that has a physical thickness of 18 nm, is made of $Al_2O_3$ as its primary ingredient, and has a refractive index of 1.63, a second layer that has a physical thickness of 30 nm, is made of $ZrO_2$ as its primary ingredient, and has a refractive index of 2.04, and a third layer that has a physical thickness of 25 nm, is made of $SiO_2$ as its primary ingredient, and has a refractive index of 1.46. The optical thicknesses of the first layer, the second layer, and the third layer of the intermediate layer 20 are 29 nm, 61 nm, and 37 nm, respectively. The fine undulation structure 30 has a physical thickness of 224 nm and refractive index which continuously increases from 1 to 1.50 from the light incident side toward the substrate side. A homogeneous portion remains under the fine undulation structure 30. The homogeneous portion has a refractive index of 1.50, a physical thickness of 34 nm, and an optical thickness of 51 nm. The sum of the optical thickness of the homogeneous portion and the optical thickness of the third layer is 88 nm.

Figure 10B:
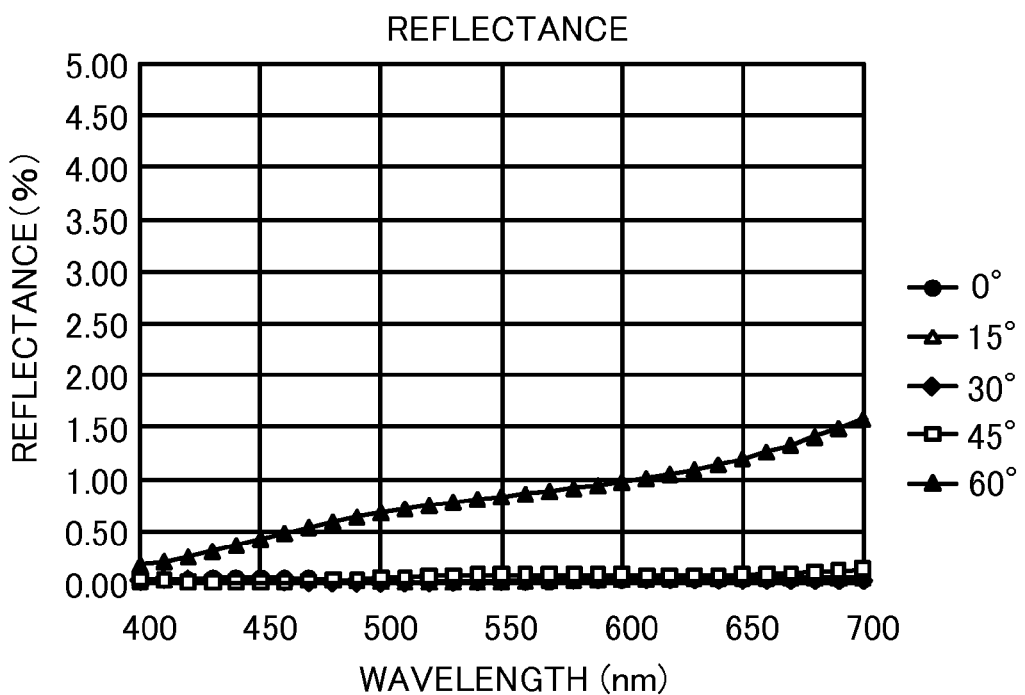

FIG. 10B is a graph illustrating reflectance characteristics of the antireflection coating 100 according to the ninth embodiment. It is understood from FIG. 10B that this embodiment provides a high reflectance performance over the overall visible range with a reflectance of 0.1% or less for an incident angle of 0°, a reflectance of 0.2% or less even for an incident angle of 45°, and a reflectance of 1.7% or less even for an incident angle of 60°.

Tenth Embodiment

Figure 11:
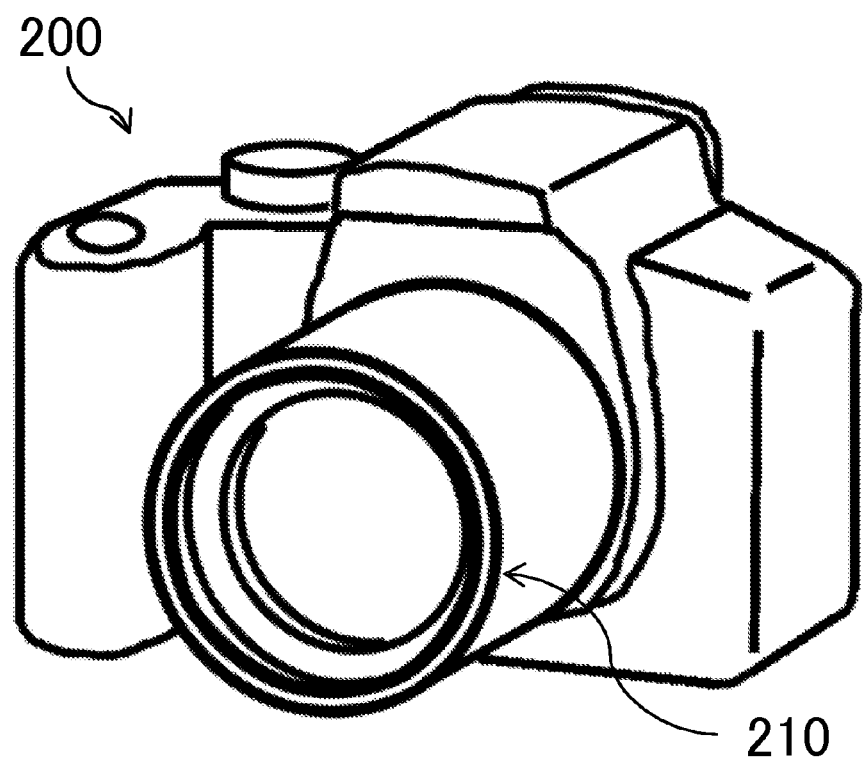
FIG. 11 is a perspective view illustrating an optical apparatus according to a tenth embodiment of the present invention.

FIG. 11 is a perspective view illustrating a digital camera 200 as an optical apparatus (an imaging-pickup apparatus) according to a tenth embodiment. The digital camera 200 has an imaging optical system 200 configured to form an optical image of an object. The imaging optical system 200 includes a plurality of lenses. The antireflection coating 100 is formed on at least one lens among the plurality of lenses. Thus, the digital camera 200 according to the tenth embodiment can generate an image in which unfavorable light such as flare and ghost are suppressed and this embodiment can provide a high quality optical apparatus.

Although this embodiment illustrates a digital camera as one example of the optical apparatus, the present invention is not limited to this embodiment and is applicable to other optical apparatuses such as binoculars and a liquid-crystal projector.

The present invention can be provide an optical element, an optical system, and an optical apparatus having an antireflection coating with a good wavelength band characteristic and incident angle characteristic for a substrate with a high refractive index.

An optical element having the antireflection coating according to the present invention is applicable to the optical apparatus such as a camera and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-278006, filed Dec. 20, 2012, which is hereby incorporated by reference herein in its entirety.

What is claimed is:

1. An optical element comprising a substrate that is transparent to light having a used wavelength region and an antireflection coating formed on the substrate,
wherein the antireflection coating includes an intermediate layer formed on the substrate, and an undulation layer that is formed on the intermediate layer and has a plurality of convexes arrayed with spacing shorter than a shortest wavelength in the used wavelength region,
wherein the undulation layer has a portion where refractive index increases from a light incident side to the substrate,
wherein the intermediate layer has a first layer closest to the substrate, and a second layer formed on the first layer, and
wherein when a refractive index of the first layer to light having a wavelength of 550 nm is denoted by n1, a refractive index of the second layer to the light having the wavelength of 550 nm is denoted by n2, and a refractive index of the substrate to the light having the wavelength of 550 nm is denoted by ns, the following conditional equations are satisfied:

$1.75 \leq ns \leq 2.20$;

$n1 < n2$; and $n1 < ns$.

2. The optical element according to claim 1, wherein the physical thickness of the undulation layer is 180 nm or more and 300 nm or less, and a maximum value of the refractive index of the undulation layer for the light having the wavelength of 550 nm falls in a range from 1.35 to 1.58.

3. The optical element according to claim 1, wherein when a physical thickness of the first layer is denoted by d1 (nm) and a physical thickness of the second layer is denoted by d2 (nm), the following conditional equations are satisfied:

$1.35 \leq n1 \leq 1.78$;

$1.78 \leq n2 \leq 2.40$;

$25 \leq n1 d1 \leq 65$; and $18 \leq n2 d2 \leq 65$.

4. The optical element according to claim 1, wherein a difference between n1 and n2 is 0.1 or more.

5. The optical element according to claim 1, wherein n2 is higher than ns.

6. The optical element according to claim 3, further comprising a third layer formed on the second layer, wherein when a refractive index of the third layer for the light having the wavelength of 550 nm is denoted by n3, the following conditional equation is satisfied:

$1.38 \leq n3 \leq 1.70$.

7. The optical element according to claim 6, wherein the undulation layer does not include, on a side of the intermediate layer, a homogeneous layer that has a constant refractive index for the light having the wavelength of 550 nm, and when a physical thickness of the third layer is denoted by d3 (nm), the following conditional equation is satisfied:

$75 \leq n3 d3 \leq 130$.

8. The optical element according to claim 6, wherein the undulation layer has, on a side of the intermediate layer, a homogeneous layer that has a constant refractive index for the light having the wavelength of 550 nm, and when a physical thickness of the third layer is denoted by d3 (nm), a refractive index of the homogeneous layer is denoted by na, and a physical thickness of the homogeneous layer is denoted by da (nm), the following conditional equations are satisfied:

$1.35 \leq na \leq 1.58$; and $75 \leq n3 d3 + nada \leq 130$.

9. The optical element according to claim 8, wherein the following conditional equation is satisfied:

$0 \leq |n3 - na| \leq 0.1$.

10. The optical element according to claim 1, wherein the undulation layer is formed by a wet process.

11. The optical element according to claim 1, wherein at least one layer in the intermediate layer is formed by an evaporation method or a sputtering method.

12. The optical element according to claim 1, wherein the undulation layer is a porous layer made of aluminum oxide as a primary ingredient.

13. The optical element according to claim 1, wherein the undulation layer is formed by forming a layer made of aluminum oxide as a primary ingredient, and then by applying a warm water treatment.

14. The optical element according to claim 1, wherein the first layer is made of $Al_2O_3$.

15. The optical element according to claim 6, wherein the third layer is made of $SiO_2$.

16. An optical system comprising an optical element that includes a substrate that is transparent to light having a used wavelength region and an antireflection coating formed on the substrate,
wherein the antireflection coating includes an intermediate layer formed on the substrate, and an undulation layer that is formed on the intermediate layer and has a plurality of convexes arrayed with spacing shorter than a shortest wavelength in the used wavelength region,
wherein the undulation layer has a portion where refractive index increases from a light incident side to the substrate,
wherein the intermediate layer has a first layer closest to the substrate, and a second layer formed on the first layer, and
wherein when a refractive index of the first layer to light having a wavelength of 550 nm is denoted by n1, a refractive index of the second layer to the light having the wavelength of 550 nm is denoted by n2, and a refractive index of the substrate to the light having the wavelength of 550 nm is denoted by ns, the following conditional equations are satisfied:

$1.75 \leq ns \leq 2.20$;

$n1 < n2$; and $n1 < ns$.

17. An optical apparatus comprising an optical system that includes an optical element, the optical element including a substrate that is transparent to light having a used wavelength region and an antireflection coating formed on the substrate,
  wherein the antireflection coating includes an intermediate layer formed on the substrate, and an undulation layer that is formed on the intermediate layer and has a plurality of convexes arrayed with spacing shorter than a shortest wavelength in the used wavelength region,
  wherein the undulation layer has a portion where refractive index increases from a light incident side to the substrate,
  wherein the intermediate layer has a first layer closest to the substrate, and a second layer formed on the first layer, and
  wherein when a refractive index of the first layer to light having a wavelength of 550 nm is denoted by n1, a refractive index of the second layer to the light having the wavelength of 550 nm is denoted by n2, and a refractive index of the substrate to the light having the wavelength of 550 nm is denoted by ns, the following conditional equations are satisfied:

$1.75 \leq ns \leq 2.20;$ $n1 < n2;$ and $n1 < ns.$

* * * * *